US008734710B2

United States Patent
Georgelos et al.

(10) Patent No.: US 8,734,710 B2
(45) Date of Patent: May 27, 2014

(54) SYNERGISTIC BIOPOLYMER BLOWN FILM EXTRUSION SYSTEM AND METHOD

(76) Inventors: Paul Georgelos, Naperville, IL (US); Pat Montefusco, Genoa, IL (US); Roy Speer, Barrington, IL (US); Jeanne M. Skaggs, Arlington Heights, IL (US); James J. Sanfilippo, Barrington Hills, IL (US)

( * ) Notice: Subject to any disclaimer, the term of this patent is extended or adjusted under 35 U.S.C. 154(b) by 19 days.

(21) Appl. No.: 13/098,312

(22) Filed: Apr. 29, 2011

(65) Prior Publication Data

US 2012/0168993 A1   Jul. 5, 2012

Related U.S. Application Data

(60) Provisional application No. 61/332,043, filed on May 6, 2010.

(51) Int. Cl.
*B29C 49/04* (2006.01)
(52) U.S. Cl.
USPC ............ 264/563; 264/555; 264/564; 264/510
(58) Field of Classification Search
None
See application file for complete search history.

(56) References Cited

U.S. PATENT DOCUMENTS

| | | | |
|---|---|---|---|
| 4,390,573 A | 6/1983 | Bullard et al. | |
| 4,479,766 A | 10/1984 | Planeta | |
| 5,411,788 A | 5/1995 | Hyde et al. | |
| 5,928,740 A * | 7/1999 | Wilhoit et al. | 428/34.9 |
| 6,254,374 B1 | 7/2001 | Hatfield | |
| 7,615,183 B2 * | 11/2009 | Tweed et al. | 264/563 |
| 7,654,428 B2 | 2/2010 | Behmel et al. | |
| 2007/0187856 A1 | 8/2007 | Kitauji et al. | |

* cited by examiner

*Primary Examiner* — Monica Huson
(74) *Attorney, Agent, or Firm* — Cardinal Law Group LLC (57) ABSTRACT

A biopolymer blown film extrusion system comprising an extruder receiving polymer pellets and at least two additives, and generating a molten mass having at least one layer; a die receiving the molten extrudates and generating a bubble having at least one layer from a die orifice; an internal bubble blower operably connected to maintain air inside the bubble; a bubble collapsing frame receiving the bubble and generating a biopolymer film having at least one layer, the film having a selected elongation at break of 180% or more in one direction and heat sealing at 195° F. or less; a nip roller operably connected to draw the biopolymer film from the bubble collapsing frame; a turning bar operably connected to change a travel angle of the biopolymer film; and a travel roller operably connected to direct travel of the biopolymer film.

15 Claims, 11 Drawing Sheets

FIG. 7  Table 1

| Run ID | Seal temperature °F | | | | | |
|---|---|---|---|---|---|---|
| | 160 | 190 | 200 | 230 | 260 | |
| XPA | | 1450 | 2850 | 3750 B | 4000 B | |
| A | | 750 | 1300 | 2870 B | 3300 B | Break Seal |
| BR | | 1350 | 1900 | 3000 B | 2700 B | |
| BL | | 2150 | 2550 | 2850 | 3390 B | |
| BW | 1800 | 2450 | 2900 | 3150 | 3550 | |
| BV | | 500 | 1250 B | 1150 B | 1400 B | |
| BX | | 1100 B | 1450 B | 1600 B | 1400 B | |

Figure 7:
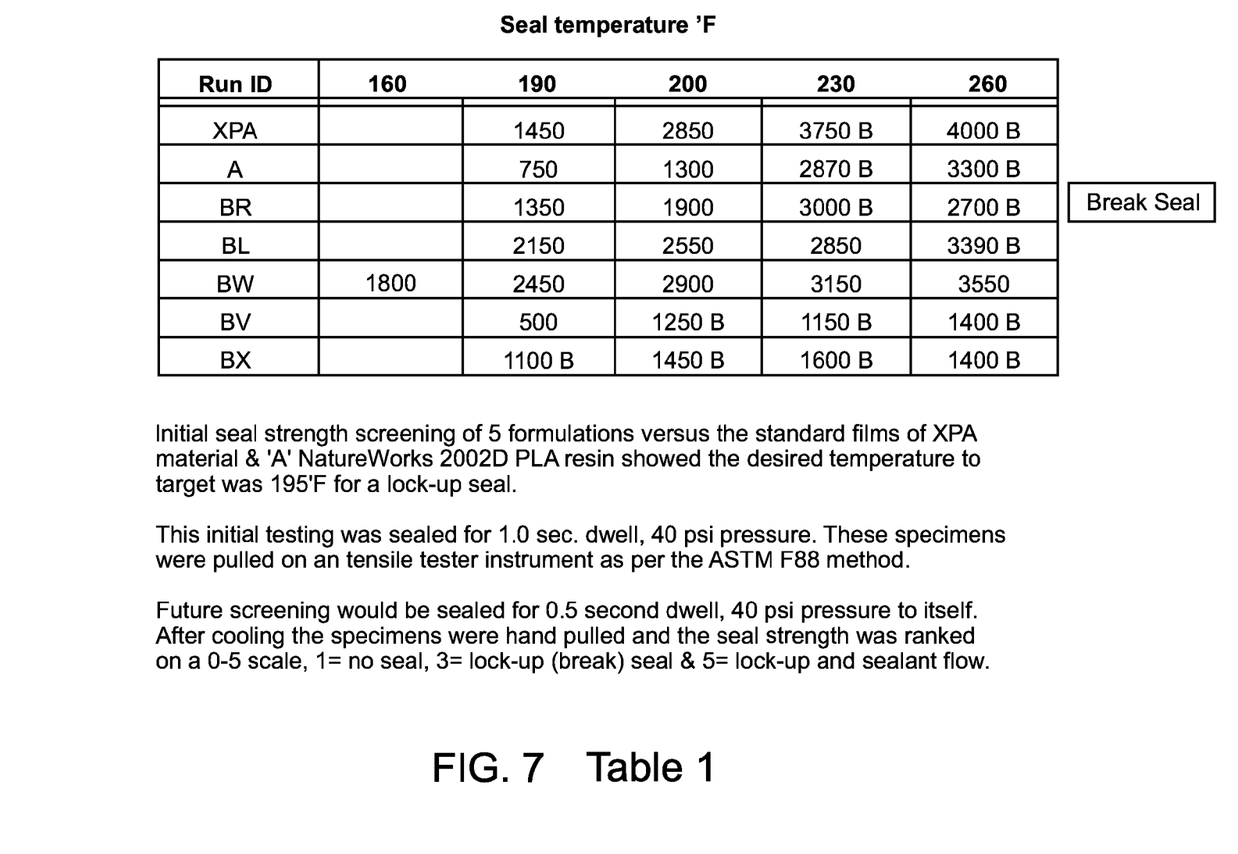
FIG. 7 depicts TABLE 1 depicts seal strength screenings of a number of formulations used to form the biopolymer film using the biopolymer blown film extrusion system in accordance with the present invention.
Figure 8A:
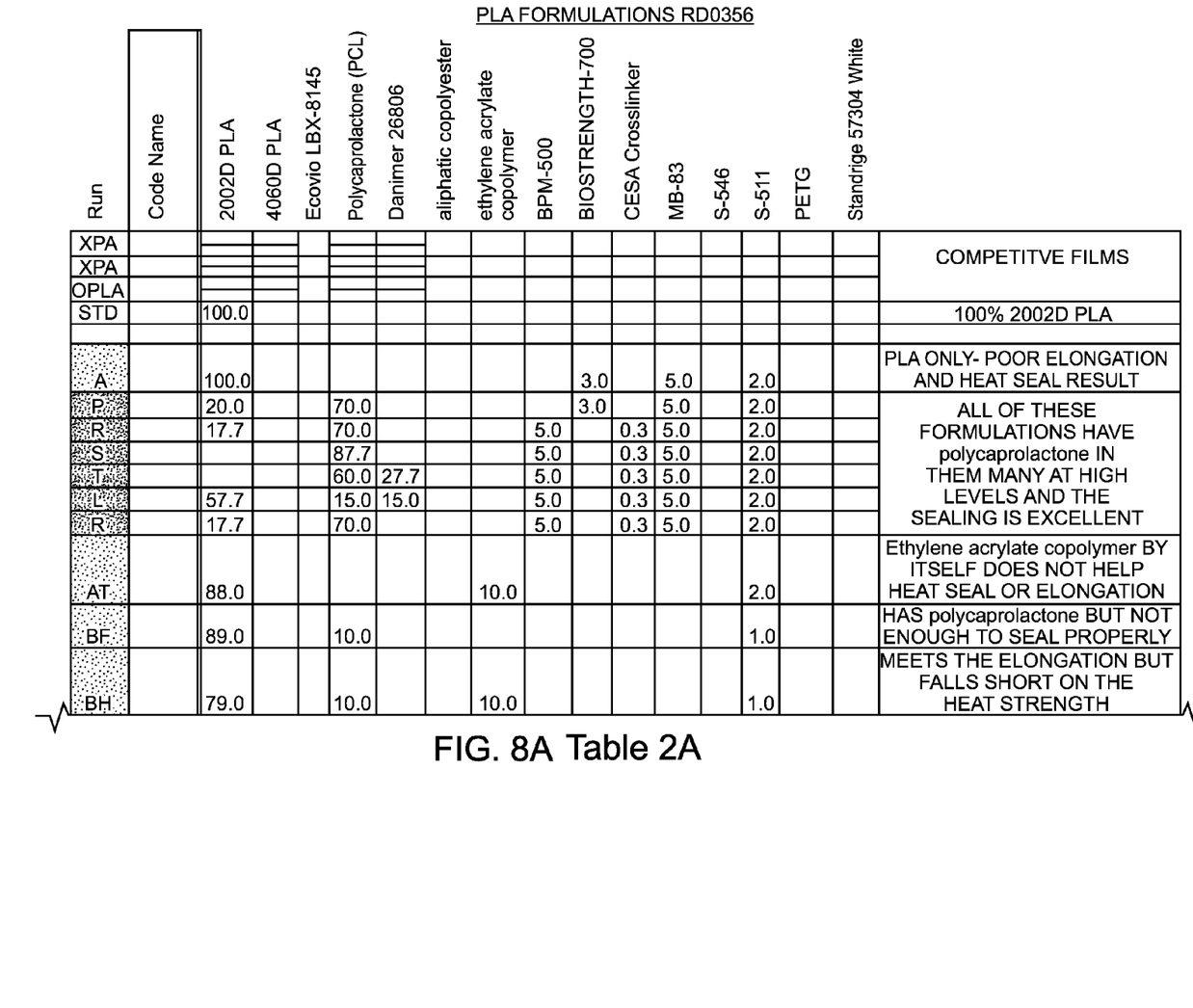
FIG. 8A-8D depict TABLE 2 (comprised of Table Portions 2A and 2B) depicts data for the formulations used to form one of more layers of the biopolymer film using the biopolymer blown film extrusion system in accordance with the present invention.
Figure 8B:
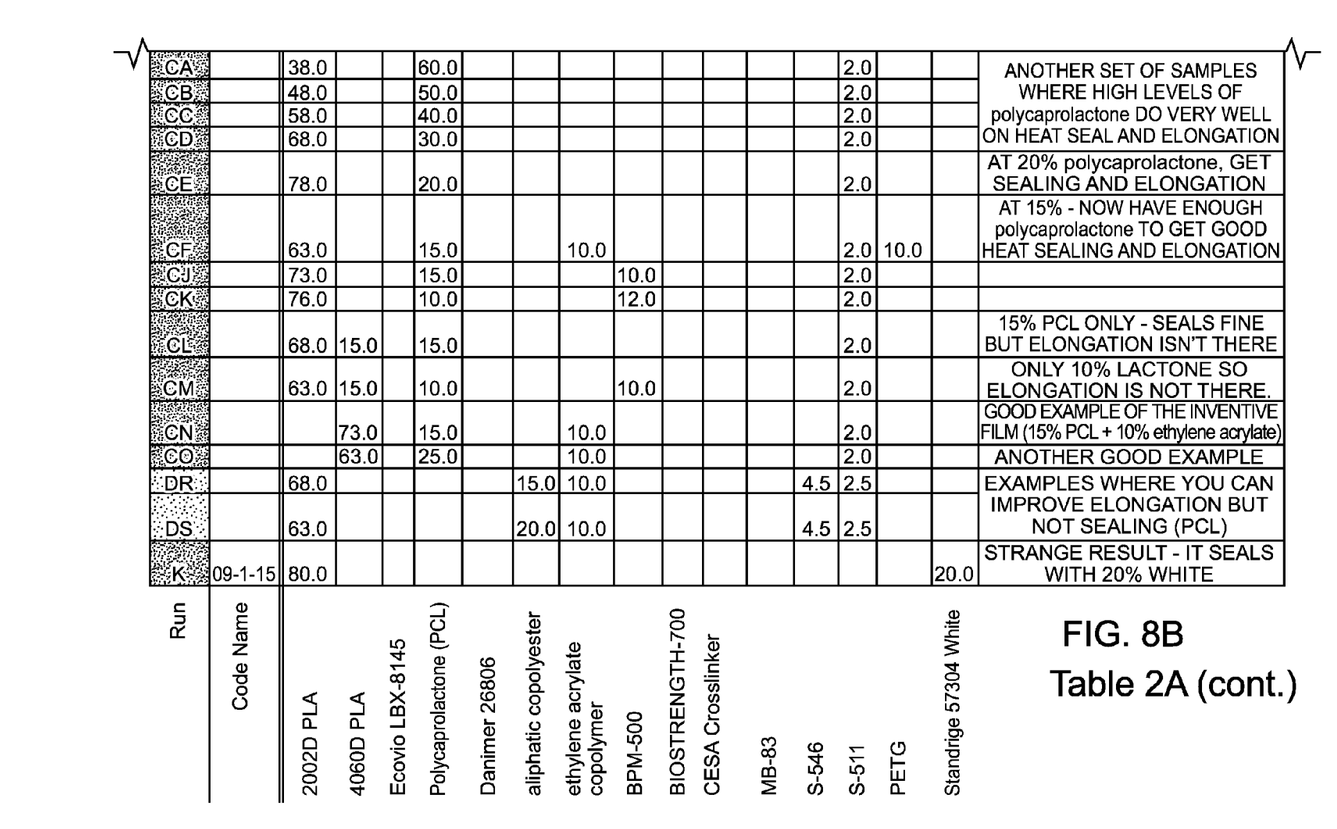
Figure 8C:
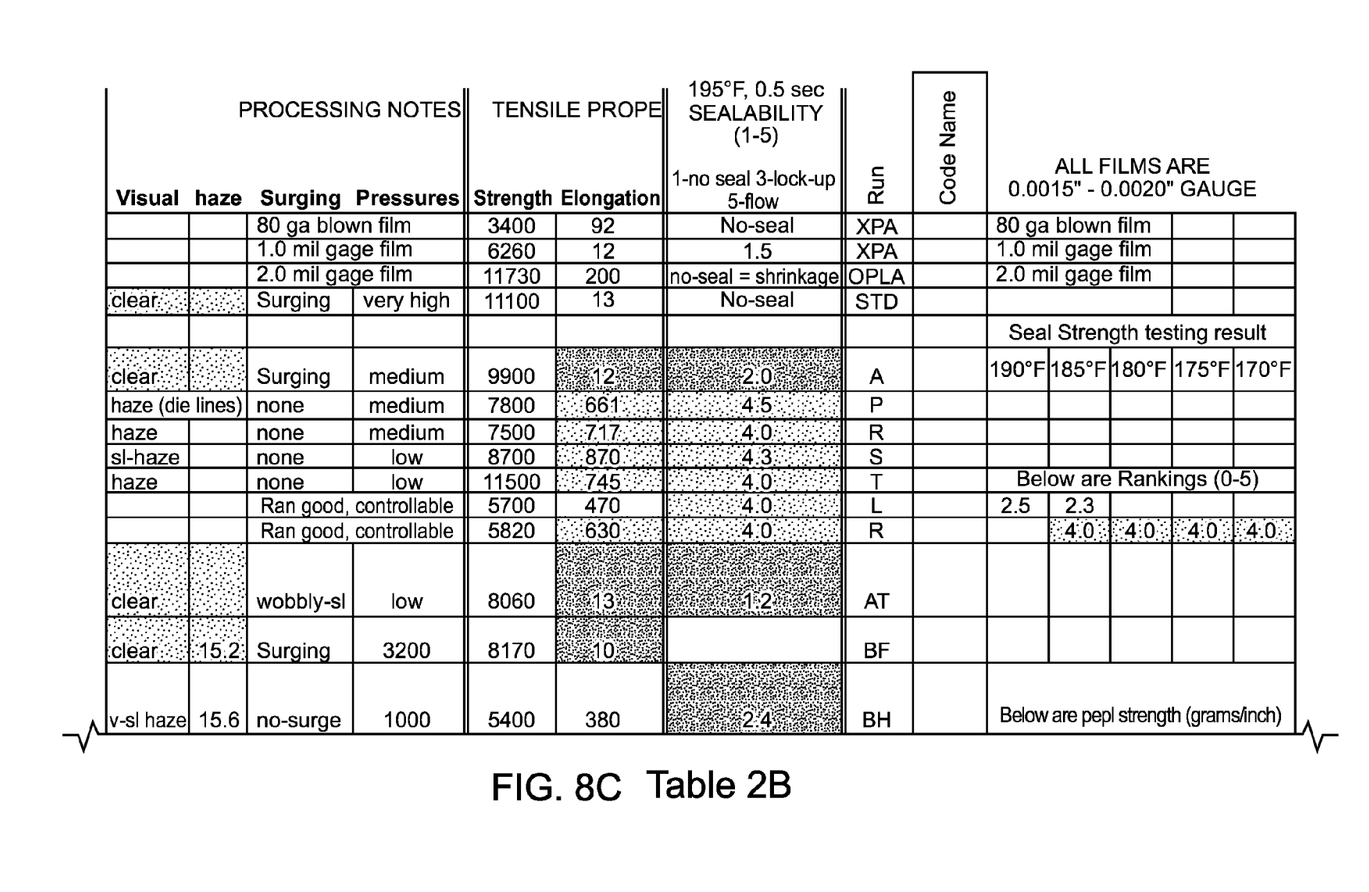
Figure 8D:
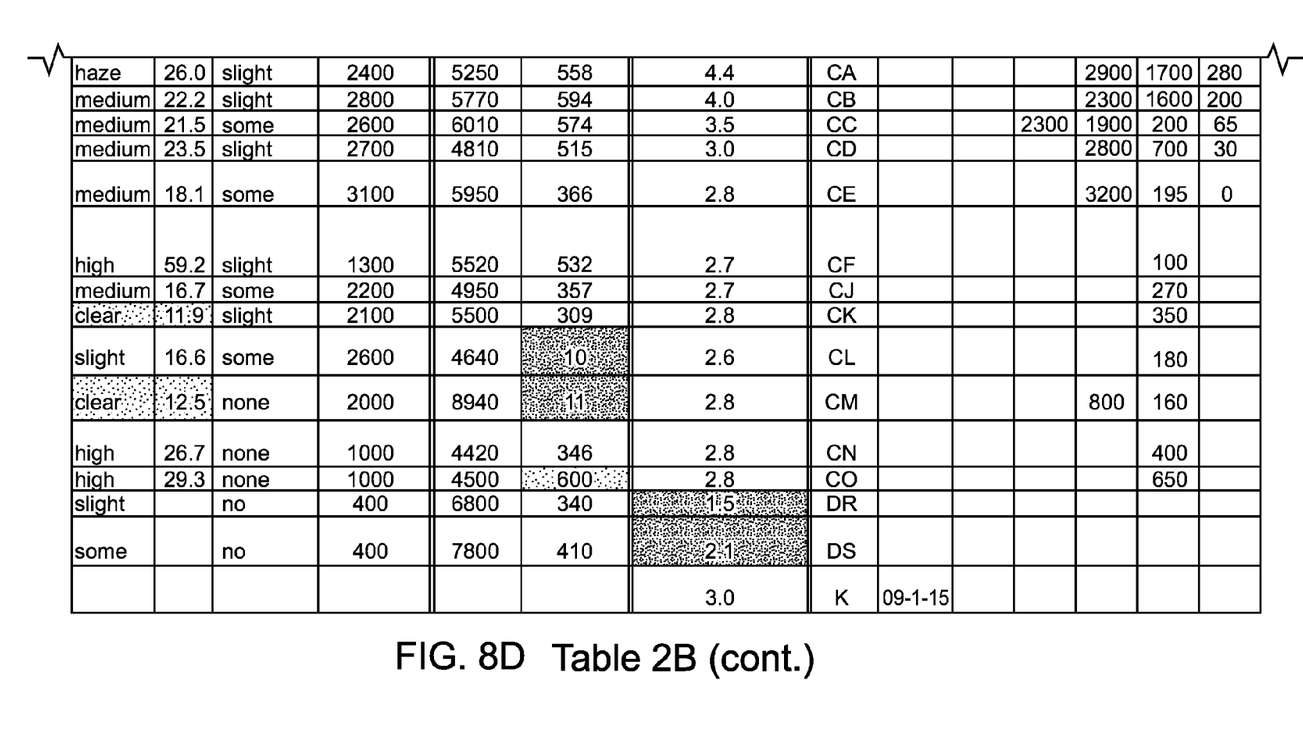

Initial seal strength screening of 5 formulations versus the standard films of XPA material & 'A' NatureWorks 2002D PLA resin showed the desired temperature to target was 195°F for a lock-up seal.

This initial testing was sealed for 1.0 sec. dwell, 40 psi pressure. These specimens were pulled on an tensile tester instrument as per the ASTM F88 method.

Future screening would be sealed for 0.5 second dwell, 40 psi pressure to itself. After cooling the specimens were hand pulled and the seal strength was ranked on a 0-5 scale, 1= no seal, 3= lock-up (break) seal & 5= lock-up and sealant flow.

PLA FORMULATIONS RD0356

| Run | Code Name | 2002D PLA | 4060D PLA | Ecovio LBX-8145 | Polycaprolactone (PCL) | Danimer 26806 | aliphatic copolyester | ethylene acrylate copolymer | BPM-500 | BIOSTRENGTH-700 | CESA Crosslinker | MB-83 | S-546 | S-511 | PETG | Standrige 57304 White | COMPETITIVE FILMS |
|---|---|---|---|---|---|---|---|---|---|---|---|---|---|---|---|---|---|
| XPA | | | | | | | | | | | | | | | | | |
| XPA | | | | | | | | | | | | | | | | | |
| OPLA | | | | | | | | | | | | | | | | | |
| STD | | 100.0 | | | | | | | | | | | | | | | 100% 2002D PLA |
| A | | 100.0 | | | | | | | | 3.0 | | 5.0 | | 2.0 | | | PLA ONLY- POOR ELONGATION AND HEAT SEAL RESULT |
| P | | 20.0 | | | 70.0 | | | | | 3.0 | | 5.0 | | 2.0 | | | ALL OF THESE FORMULATIONS HAVE polycaprolactone IN THEM MANY AT HIGH LEVELS AND THE SEALING IS EXCELLENT |
| R | | 17.7 | | | 70.0 | | | | 5.0 | | 0.3 | 5.0 | | 2.0 | | | |
| S | | | | | 87.7 | | | | 5.0 | | 0.3 | 5.0 | | 2.0 | | | |
| T | | | | | 60.0 | 27.7 | | | 5.0 | | 0.3 | 5.0 | | 2.0 | | | |
| L | | 57.7 | | | 15.0 | 15.0 | | | 5.0 | | 0.3 | 5.0 | | 2.0 | | | |
| R | | 17.7 | | | 70.0 | | | | 5.0 | | 0.3 | 5.0 | | 2.0 | | | |
| AT | | 88.0 | | | | | | 10.0 | | | | | | 2.0 | | | Ethylene acrylate copolymer BY ITSELF DOES NOT HELP HEAT SEAL OR ELONGATION |
| BF | | 89.0 | | | 10.0 | | | | | | | | | 1.0 | | | HAS polycaprolactone BUT NOT ENOUGH TO SEAL PROPERLY |
| BH | | 79.0 | | | 10.0 | | | 10.0 | | | | | | 1.0 | | | MEETS THE ELONGATION BUT FALLS SHORT ON THE HEAT STRENGTH |

FIG. 8A Table 2A

FIG. 8B
Table 2A (cont.)

| Run | Code Name | 2002D PLA | 4060D PLA | Ecovio LBX-8145 | Polycaprolactone (PCL) | Danimer 26806 aliphatic copolyester | ethylene acrylate copolymer | BPM-500 | BIOSTRENGTH-700 | CESA Crosslinker | MB-83 | S-546 | S-511 | PETG | Standrige 57304 White | Notes |
|---|---|---|---|---|---|---|---|---|---|---|---|---|---|---|---|---|
| CA | | 38.0 | | | 60.0 | | | | | | | | | | | ANOTHER SET OF SAMPLES WHERE HIGH LEVELS OF polycaprolactone DO VERY WELL ON HEAT SEAL AND ELONGATION |
| CB | | 48.0 | | | 50.0 | | | | | | | | 2.0 | | | |
| CC | | 58.0 | | | 40.0 | | | | | | | | 2.0 | | | |
| CD | | 68.0 | | | 30.0 | | | | | | | | 2.0 | | | |
| CE | | 78.0 | | | 20.0 | | | | | | | | 2.0 | | | AT 20% polycaprolactone, GET SEALING AND ELONGATION |
| CF | | 63.0 | | | 15.0 | | | | | | | | | | | AT 15% - NOW HAVE ENOUGH polycaprolactone TO GET GOOD HEAT SEALING AND ELONGATION |
| CJ | | 73.0 | | | 15.0 | | | | | | | | 2.0 | 10.0 | | |
| CK | | 76.0 | | | 10.0 | | | 10.0 | | | | | 2.0 | | | |
| CL | | 68.0 | 15.0 | | 15.0 | | | 12.0 | | | | | 2.0 | | | 15% PCL ONLY - SEALS FINE BUT ELONGATION ISN'T THERE |
| CM | | 63.0 | 15.0 | | 10.0 | | | 10.0 | | | | | 2.0 | | | ONLY 10% LACTONE SO ELONGATION IS NOT THERE. |
| CN | | | 73.0 | | 15.0 | | 10.0 | | | | | | 2.0 | | | GOOD EXAMPLE OF THE INVENTIVE FILM (15% PCL + 10% ethylene acrylate) |
| CO | | | 63.0 | | 25.0 | | 10.0 | | | | | | 2.0 | | | ANOTHER GOOD EXAMPLE |
| DR | | 68.0 | | | | 15.0 | 10.0 | | | | | 4.5 | 2.5 | | | EXAMPLES WHERE YOU CAN IMPROVE ELONGATION BUT NOT SEALING (PCL) |
| DS | | 63.0 | | | | 20.0 | 10.0 | | | | | 4.5 | 2.5 | | | |
| K | 09-1-15 | 80.0 | | | | | | | | | | | | | 20.0 | STRANGE RESULT - IT SEALS WITH 20% WHITE |

FIG. 8C Table 2B

| | PROCESSING NOTES | | | TENSILE PROPE | | 195°F, 0.5 sec SEALABILITY (1-5) 1-no seal 3-lock-up 5-flow | Run | Code Name | ALL FILMS ARE 0.0015" - 0.0020" GAUGE | | | | |
|---|---|---|---|---|---|---|---|---|---|---|---|---|---|
| Visual | haze | Surging | Pressures | Strength | Elongation | | | | | | | | |
| | | | 80 ga blown film | 3400 | 92 | No-seal | XPA | | 80 ga blown film | | | | |
| | | | 1.0 mil gage film | 6260 | 12 | 1.5 | XPA | | 1.0 mil gage film | | | | |
| | | | 2.0 mil gage film | 11730 | 200 | no-seal = shrinkage | OPLA | | 2.0 mil gage film | | | | |
| clear | | Surging | very high | 11100 | 13 | No-seal | STD | | Seal Strength testing result | | | | |
| | | | | | | | | | 190°F | 185°F | 180°F | 175°F | 170°F |
| clear | | Surging | medium | 9900 | 12 | 2.0 | A | | | | | | |
| haze (die lines) | | none | medium | 7800 | 661 | 4.5 | P | | | | | | |
| haze | | none | medium | 7500 | 717 | 4.0 | R | | | | | | |
| sl-haze | | none | low | 8700 | 870 | 4.3 | S | | | | | | |
| haze | | none | low | 11500 | 745 | 4.0 | T | | Below are Rankings (0-5) | | | | |
| | | Ran good, controllable | | 5700 | 470 | 4.0 | L | | 2.5 | | | | |
| | | Ran good, controllable | | 5820 | 630 | 4.0 | R | | 2.3 | 4.0 | 4.0 | 4.0 | 4.0 |
| clear | | wobbly-sl | low | 8060 | 13 | 1.2 | AT | | | | | | |
| clear | 15.2 | Surging | 3200 | 8170 | 10 | | BF | | | | | | |
| v-sl haze | 15.6 | no-surge | 1000 | 5400 | 380 | 2.4 | BH | | Below are peel strength (grams/inch) | | | | |

| | | | | | | | | | | | | |
|---|---|---|---|---|---|---|---|---|---|---|---|---|
| haze | 26.0 | slight | 2400 | 5250 | 558 | 4.4 | CA | | 2900 | 1700 | 280 | |
| medium | 22.2 | slight | 2800 | 5770 | 594 | 4.0 | CB | | 2300 | 1600 | 200 | |
| medium | 21.5 | some | 2600 | 6010 | 574 | 3.5 | CC | 2300 | 1900 | 200 | 65 | |
| medium | 23.5 | slight | 2700 | 4810 | 515 | 3.0 | CD | | 2800 | 700 | 30 | |
| medium | 18.1 | some | 3100 | 5950 | 366 | 2.8 | CE | | 3200 | 195 | 0 | |
| high | 59.2 | slight | 1300 | 5520 | 532 | 2.7 | CF | | | | | |
| medium | 16.7 | some | 2200 | 4950 | 357 | 2.7 | CJ | | | 100 | | |
| clear | 11.9 | slight | 2100 | 5500 | 309 | 2.8 | CK | | | 270 | | |
| slight | 16.6 | some | 2600 | 4640 | 10 | 2.6 | CL | | | 350 | | |
| clear | 12.5 | none | 2000 | 8940 | 11 | 2.8 | CM | | 800 | 180 | | |
| high | 26.7 | none | 1000 | 4420 | 346 | 2.8 | CN | | | 160 | | |
| high | 29.3 | none | 1000 | 4500 | 600 | 2.8 | CO | | | 400 | | |
| slight | | no | 400 | 6800 | 340 | 1.5 | DR | | | 650 | | |
| some | | no | 400 | 7800 | 410 | 2.1 | DS | | | | | |
| | | | | | | 3.0 | K | 09-1-15 | | | | |

FIG. 8D  Table 2B (cont.)

FIG. 9 Graph 1

US 8,734,710 B2

SYNERGISTIC BIOPOLYMER BLOWN FILM EXTRUSION SYSTEM AND METHOD

CLAIM FOR PRIORITY

This application claims priority U.S. Provisional Application No. 61/332,043 titled "Comprehensive Biopolymer Blown Film Extrusion System and Method" filed May 6, 2010, the complete subject matter of each of which is incorporated herein by reference in its entirety.

TECHNICAL FIELD

The field of this disclosure is systems and methods for fabricating polymer films, particularly, a biopolymer blown film extrusion system and method.

BACKGROUND

Blown films are produced by forming a cylindrical bubble from molten polymer materials, then cooling and splitting the cylindrical bubble to form the blown film. The process is continuous, so the blown film forms long continuous sheets which can be rolled for transport and storage. The blown film can be fabricated into items such as carrier bags, food packaging, stand up pouches, and label films.

Increasing environmental awareness on the part of consumers has led to an increasing demand for biopolymer blown films, i.e., films made from renewable resources which are biodegradable such as polylactic acid (PLA) and the like. Unfortunately, biopolymers are difficult to handle when forming the blown film. Biopolymers are stiff and brittle, with poor elongation properties, resulting in low bubble strength and bubble tears. For example, blown films made of greater than 95 percent PLA typically have elongation-at-break values under 20 percent. Further, the blown films wrinkle and tear easily during handling after the bubble has been collapsed into the blown film so that the blown film breaks when being wound into rolls. Such problems increase costs through lost production and lost materials, preventing efficient biopolymer film production on blown film lines.

It would be desirable to have a biopolymer blown film extrusion system and method that would overcome the above disadvantages.

SUMMARY OF THE INVENTION

One aspect of the present invention relates to a biopolymer blown film extrusion system comprising an extruder receiving polymer pellets (biopolymer pellets for example) and at least two additives, and generating a molten mass having at least one layer; a die receiving the molten mass and generating a bubble having at least one layer from a die orifice; an internal bubble blower operably connected to maintain air inside the bubble; a bubble collapsing frame receiving the bubble and generating a biopolymer film having at least one layer, the film having a selected elongation at break of 180% or more in one direction and heat sealing at 200° F. or less (195° F. for example); a nip roller operably connected to draw the biopolymer film from the bubble collapsing frame; a turning bar operably connected to change a travel angle of the biopolymer film; and a travel roller (a concave travel roller for example) operably connected to direct travel of the biopolymer film Another aspect of the present invention relates to a biopolymer blown film extrusion system comprising a plurality of extruders, each of the plurality of extruders receiving polymer pellets, and generating a layered molten mass; a multilayer die receiving the layer molten masses and generating a multilayered bubble from a die orifice; an internal bubble blower operably connected to maintain air inside the multilayered bubble; a bubble collapsing frame receiving the multilayered bubble and generating a biopolymer film, at least one layer of the film having a selected elongation at break of 180% or more in one direction and heat sealing at 200° F. or less (195° F. for example); a nip roller operably connected to draw the biopolymer film from the bubble collapsing frame; a turning bar operably connected to change travel angle of the biopolymer film; and a concave travel roller operably connected to direct travel of the biopolymer film, wherein at least one of the plurality of extruders receives biopolymer pellets and at least two additives.

Yet another aspect of the present invention relates to a method of forming a biopolymer blown film comprising extruding at least one biopolymer having at least two additives to form a feed; passing the feed through a die orifice to form a bubble; collapsing the bubble to form a biopolymer film having at least one of a selected elongation at break of 180% or more in one direction and heat sealing at 200° F. or less (195° F. for example); drawing the biopolymer film through a nip roller; changing travel angle of the biopolymer film with a turning bar; and directing travel of the biopolymer film with a travel roller.

Yet one other aspect of the present invention relates to a method of forming a biopolymer blown film comprising layering a plurality of extruded polymers to form a layered feed, at least one of the plurality of extruded polymers being a biopolymer having at least two additives; passing the layered feed through a die orifice to form a multilayer bubble; collapsing the multilayered bubble to form a biopolymer film having at least one layer having a selected elongation at break of 180% or more in one direction and heat sealing at 200° F. or less (195° F. for example); drawing the biopolymer film through a nip roller; changing travel angle of the biopolymer film with a turning bar; and directing travel of the biopolymer film with a travel roller.

Still yet another aspect of the present invention relates to a biopolymer blown film extrusion system comprising an extruder receiving biopolymer pellets and at least two additives, and generating a molten mass; a die receiving the molten mass and generating a bubble from a die orifice, the die orifice being less than or equal to 0.070 inches wide; an internal bubble blower operably connected to maintain heated air inside the bubble; a bubble collapsing frame receiving the bubble and generating a biopolymer film having a selected elongation at break of 180% or more in one direction and heat sealing at 200° F. or less (195° F. for example); a heated nip roller operably connected to draw the biopolymer film from the bubble collapsing frame; a turning bar operably connected to change travel angle of the biopolymer film, the turning bar providing a heated air stream to maintain separation between the turning bar and the biopolymer film; and a concave travel roller operably connected to direct travel of the biopolymer film.

One more aspect relates to a biopolymer blown film extrusion system comprising a plurality of extruders, each of the plurality of extruders receiving polymer pellets and generating a layered molten mass, at least one of the plurality of extruders receiving biopolymer pellets and at least two additives; a multilayer die receiving the layered molten masses and generating a multilayered bubble from a die orifice, the die orifice being less than or equal to 0.070 inches wide; an internal bubble blower operably connected to maintain heated air inside the multilayered bubble; a bubble collapsing frame receiving the multilayered bubble and generating a biopolymer film having at least one of a selected elongation at break of 180% or more in one direction and heat sealing at 200° or less (195° F. for example); a heated nip roller operably connected to draw the biopolymer film from the bubble collapsing frame; a turning bar operably connected to change travel angle of the biopolymer film, the turning bar providing a heated air stream to maintain separation between the turning bar and the biopolymer film; and a concave travel roller operably connected to direct travel of the biopolymer film.

Still another aspect of the present invention relates to a method of forming a biopolymer blown film comprising providing at least one biopolymer; blending at least two additives with the biopolymer and forming a molten mass; forming a bubble having at least one layer from the molten mass; and collapsing the bubble to form a biopolymer film having at least one layer, whereby the biopolymer film has a selected elongation at break of 180% or more in one direction and heat sealing at 200° F. or less (195° F. for example).

Yet another aspect relates to a method of forming a biopolymer blown film comprising providing at least one biopolymer; blending at least two additives with the biopolymer and forming a molten mass; forming a multilayered bubble from the molten mass; and collapsing the bubble to form a biopolymer film having at least two layers, whereby at least one of the layers of the biopolymer film having a selected elongation at break of 180% or more in one direction and heat sealing at 200° F. or less (195° F. for example).

One other aspect relates to a method of forming a biopolymer blown film comprising forming one layer having at least an amorphous polylactic acid polymer (PLA) and two additives, the one layer having a selected elongation at break of 180% or more in one direction and heat sealing at 200° F. or less (195° F. for example); and forming at least one other layer having semicrystalline polylactic acid polymer (PLA) and at least two additives, the other layer having a selected elongation at break of 180% or more in one direction.

The foregoing and other features and advantages of the invention will become further apparent from the following detailed description of the presently preferred embodiments, read in conjunction with the accompanying drawings. The detailed description and drawings are merely illustrative of the invention, rather than limiting the scope of the invention being defined by the appended claims and equivalents thereof.

DETAILED DESCRIPTION

Reference will now be made in detail to the presently preferred embodiments and methods of the invention as illustrated in the accompanying drawings, in which like reference characters designate like or corresponding parts throughout the drawings. It should be noted, however, that the invention in its broader aspects is not limited to the specific details, representative devices and methods, and illustrative examples shown and described in this section in connection with the preferred embodiments and methods. The invention according to its various aspects is particularly pointed out and distinctly claimed in the attached claims read in view of this specification, and appropriate equivalents.

In describing the presently preferred embodiments and methods according to the invention, a number of terms will be used, the definitions or scope of which will now be described.

As defined herein, the terms "multilayered film", "multilayered films", "multilayered structure", or "one or more layers" refer to a plurality of layers in a single film or substrate structure generally in the form of a sheet or web, which may be made from a polymer material, a non-polymer material, a bio-polymer material, some combination thereof or the like for example, bonded together by any conventional means known in the art (co-extrusion, extrusion coating, lamination, solvent coating, emulsion coating, suspension coating, adhesive bonding, pressure bonding, heat sealing, thermal lamination, ultrasonic welding, some combination thereof or the like for example).

As defined herein, the term "polymer" refers to the product of a polymerization reaction, and is inclusive of homopolymers, copolymers, terpolymers, or the like for example, the layers of a film or film substrate can consist essentially of a single polymer, or can have still additional polymers together therewith, i.e., blended therewith.

As defined herein, the term "copolymer" refers to polymers formed by the polymerization of at least two different monomers. For example, the term "copolymer" can include the co-polymerization reaction product of ethylene and an alpha-olefin, such as 1-hexene. The term "copolymer" is also inclusive of, for example, the co-polymerization of a mixture of ethylene, propylene, 1-propene, 1-butene, 1-hexene, and 1-octene. As defined herein, a copolymer identified in terms of a plurality of monomers, e.g., "propylene/ethylene copolymer", refers to a copolymer in which either a monomer may co-polymerize in a higher weight or molar percent than the other monomer or monomers. However, the first listed monomer preferably polymerizes in a higher weight percent than the second listed monomer.

As defined herein, the terms "join", "joins", and "adheres" are used in their broad sense to mean two formerly separate portions of a single laminate or one or two layers of a substrate which are connected together either by folding the laminate or layer onto itself thereby defining an edge or by bonding at least a portion of two layers together with an adhesive or by other means known to those skilled in the art.

As defined herein the term "biodegradable" refers to material which, when exposed to an aerobic and/or anaerobic environment, ultimately results in the reduction to monomeric components due to microbial, hydrolytic, and/or chemical actions. Under aerobic conditions, biodegradation leads to the transformation of the material to end products such as carbon dioxide and water. Under anaerobic conditions, biodegradation leads to the transformation of the materials to carbon dioxide, water, and methane. The biodegradability process is often described as mineralization. Biodegradability means that all organic constituents of the films are subject to decomposition eventually through biological or any other natural activity.

As defined herein, "film" means an extremely thin continuous piece of a substance having a high length to thickness ratio and a high width to thickness ratio. Such a film or laminate is described in U.S. Pat. No. 5,498,692, incorporated herein in its entirety by reference, which uses blended or laminated compositions as described herein. As defined herein, "blend" means a composition having two or more ingredients (i.e. poly (3-hydroxyalkanoate) or PHA with polylactic acid, or PLA or PHA with or without particulate fillers). While there is no requirement for a precise upper limit of thickness, a preferred upper limit would be 0.010", even more preferably about 0.005"; more preferably still about 0.001". The protective value of any film depends on its being continuous, i.e., without holes or cracks. Breathable films include dispersed particulate filler, the film having been stretched to produce continuous pores that prevent penetration of liquid and that pass moisture vapor. A breathable film may be one layer of a multilayer film. The film may be a multilayer film, i.e., a laminate or composite. A laminate is defined as two or more films joined together. A laminate may have one or more layers comprising a blended PHA/PLA composition as set forth herein. In another embodiment, a laminate may have a first layer comprising a PHA copolymer as described herein and a second layer comprising a PLA polymer or copolymer as set forth herein. The laminate may have a first layer comprising a PHA copolymer, a second layer comprising a PHA/PLA blend, and a third layer comprising PLA, or any combination of layers desired. As used, the terms first, second, or third layers are simply used to describe separate layers and are not intended to be limiting as to the location of the layer.

Figure 1:
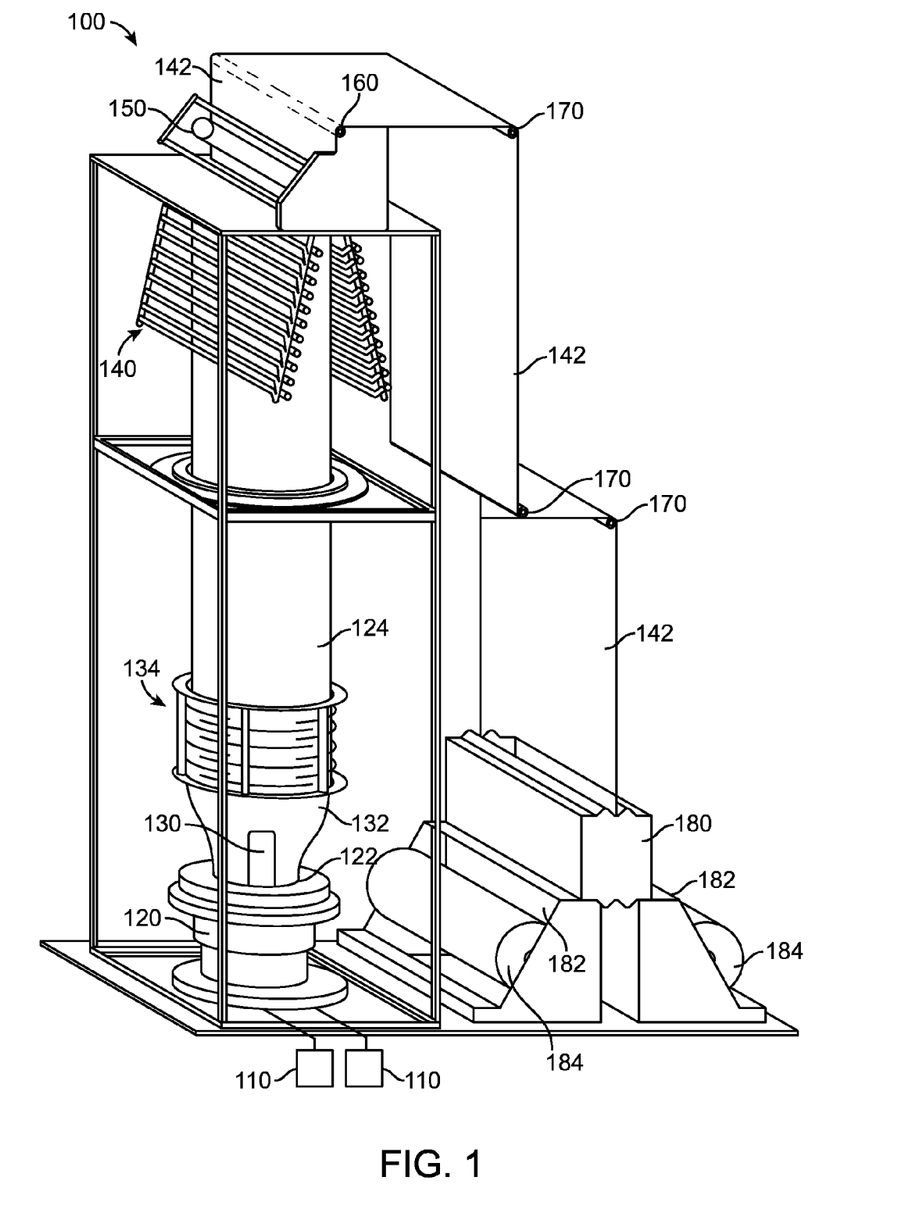
FIG. 1 is a perspective view of a biopolymer blown film extrusion system in accordance with the present invention.

FIG. 1 is a perspective view of a biopolymer blown film extrusion system 100 in accordance with the present invention having new and unexpected results.

The biopolymer blown film extrusion system 100 includes a number of extruders 110, each of the extruders 110 receiving polymer pellets and generating a molten mass or extrudate that is fed into a die. At least one of the extruders 110 receives biopolymer pellets disclosed in TABLES 1 and 2 illustrated in FIGS. 7 and 8A-8D (amorphous polylactic acid polymer (PLA) for example) and one or more additives disclosed in TABLE 2 (crosslinker, polycaprolactone, impact modifier, melt strength improver, slip modifier or additive, anti-block modifier, surface appearance modifier, processing aid, combinations thereof and the like) so that a monolayer or multilayer bubble 124 and biopolymer film 142 includes at least one biopolymer layer. A multilayer die 120 receives the 1 molten masse or extrudates from the extruders 110 and generates a multilayer bubble 124 from a die orifice 122 in the multilayer die 120. In one example, the multilayer die 120 is an Alpine three layer die available from Hosokawa Alpine American, Inc., of Natick, Mass.

An internal bubble blower 130 within the multilayer bubble 124 is operably connected to maintain air 132 inside the multilayer bubble 124. The biopolymer blown film extrusion system 100 can also include a bubble cage 134 to help control the travel of the multilayer bubble 124. A bubble collapsing frame 140 receives the multilayer bubble 124 and generates a biopolymer film 142 from the collapsed multilayer bubble 124. A nip roller 150 is operably connected to draw the biopolymer film 142 from the bubble collapsing frame 140. A turning bar 160 is operably connected to change the travel angle of the biopolymer film 142. Travel rollers 170 are operably connected to direct travel of the biopolymer film 142. The biopolymer blown film extrusion system 100 can also include a splitter 180 to cut the biopolymer film 142 into two biopolymer film sheets 182 that are rolled into biopolymer film rolls 184.

The biopolymer blown film extrusion system 100 can include features to prevent the multilayer bubble 124 and biopolymer film 142 from tearing and/or wrinkling. In one embodiment, the internal bubble blower 130 maintains heated air inside the multilayer bubble 124. In one embodiment, centering rollers (not shown) are added between the bubble cage 134 and the bubble collapsing frame 140 (i.e., before the bubble collapsing frame 140, to further stabilize the multilayer bubble 124 before it feeds into the collapsing frame. In one embodiment, the density of the slats in the bubble collapsing frame 140) is selected to frictionally heat the multilayer bubble 124 to a desired temperature before the nip roller 150, allowing the multilayer bubble 124 to stretch into a flat tube. In one embodiment, the nip roller 150 is heated. The heated nip roller can be heated with steam, hot air, electricity, or the like, as desired for a particular application. In one embodiment, the turning bar 160 provides a heated air stream to keep the film pliable while maintaining separation between the turning bar 160 and the biopolymer film 142. In one embodiment, the travel roller 170 can be concave to reduce wrinkling of the biopolymer film 142. In one example, the concavity 172 can be about 0.060 inches.

The multilayer die 120 and the extruders 110 can be selected to be compatible with a biopolymer feedstock, such as polylactic acid (PLA) or the like. In one embodiment, the die orifice 122 in the multilayer die 120 can be less than or equal to 0.070 inches wide to increase the pressure in the multilayer die 120. In another embodiment, the die orifice 122 in the multilayer die 120 can be less than or equal to 0.055 inches wide. In one example, the pressure in the multilayer die 120 is greater than or equal to 2000 psi. In one embodiment, the extruders 110 are grooved feed extruders and the feed throat of each extruder is heated to prevent lockup of the extrusion screw during operation. The extruder receives feedstock, transports the feedstock through a feed section to a compression section where the feedstock is plasticized, and pumps the plasticized feedstock through a metering section into a die. Grooved feed extruders include grooves in the feed section. Those skilled in the art will appreciate that the extruder design parameters, such as the L/D ratio (barrel length/barrel diameter), number of grooves, groove pitch, groove depth, and the like, can be selected as desired for a particular application.

The biopolymer feedstock provided to the extruders 110 can be formulated so that the feedstock, which includes a large proportion of PLA, has the tensile strength and elongation properties required to properly extrude and separate into the two biopolymer film sheets, producing a good quality film on a blown film line. In one embodiment, the PLA biopolymer film has a greater than 180 percent elongation at break value in at least one direction, which allows the biopolymer film sheets to be wound into biopolymer film rolls without breaking.

Figure 2:
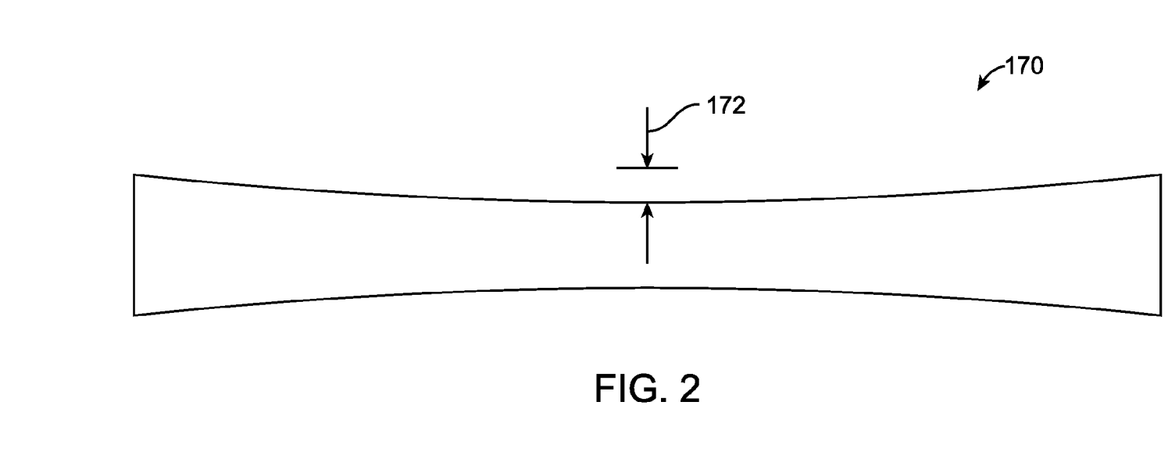
FIG. 2 is a side view of a travel roller for a biopolymer blown film extrusion system in accordance with the present invention.

FIG. 2, in which like elements share like reference numbers with FIG. 1, is a side view of a travel roller for a biopolymer blown film extrusion system in accordance with the present invention. In this embodiment, the travel roller 170 is concave to reduce wrinkling of the biopolymer film. In one example, the concavity 172 is about 0.060 inches with respect to the travel roller.

Figure 3:
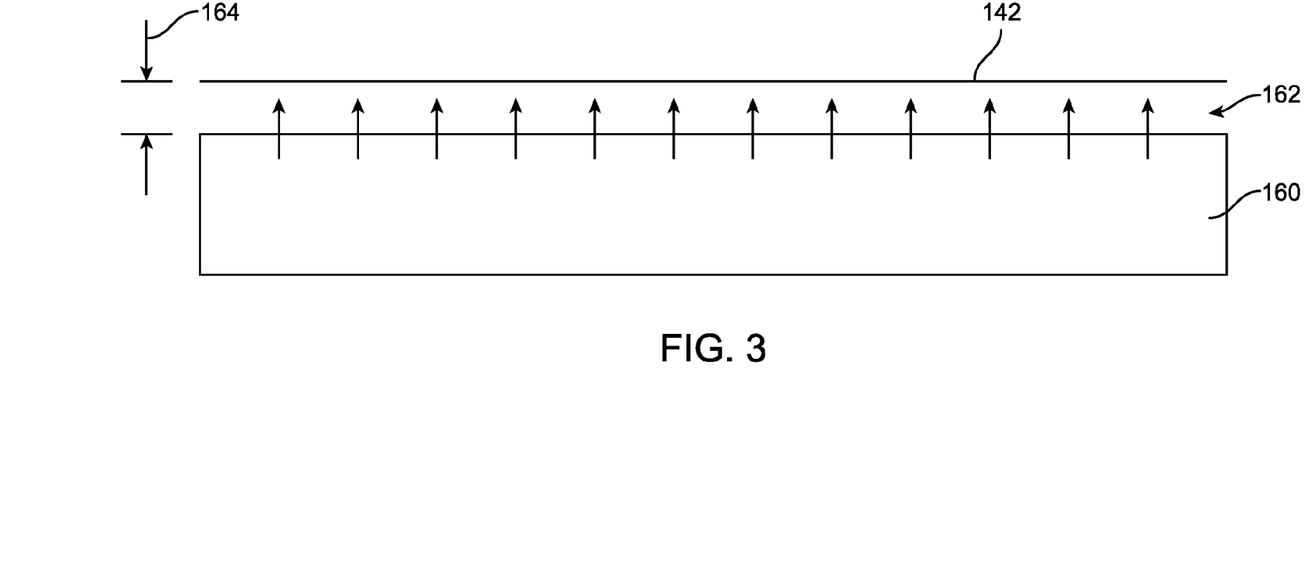
FIG. 3 is a schematic drawing of a turning bar for a biopolymer blown film extrusion system in accordance with the present invention.

FIG. 3, in which like elements share like reference numbers with FIG. 1, is a schematic drawing of a turning bar for a biopolymer blown film extrusion system in accordance with the present invention. In this embodiment, the turning bar 160 provides a heated air stream 162 as indicated by the arrows in FIG. 3 to maintain separation 164 between the turning bar 160 and the biopolymer film 142. In one example, the heated air stream 162 can have a temperature of about 120 degrees Fahrenheit to 180 degrees Fahrenheit and the separation 164 can be about 0.001 inches.

Figure 4:
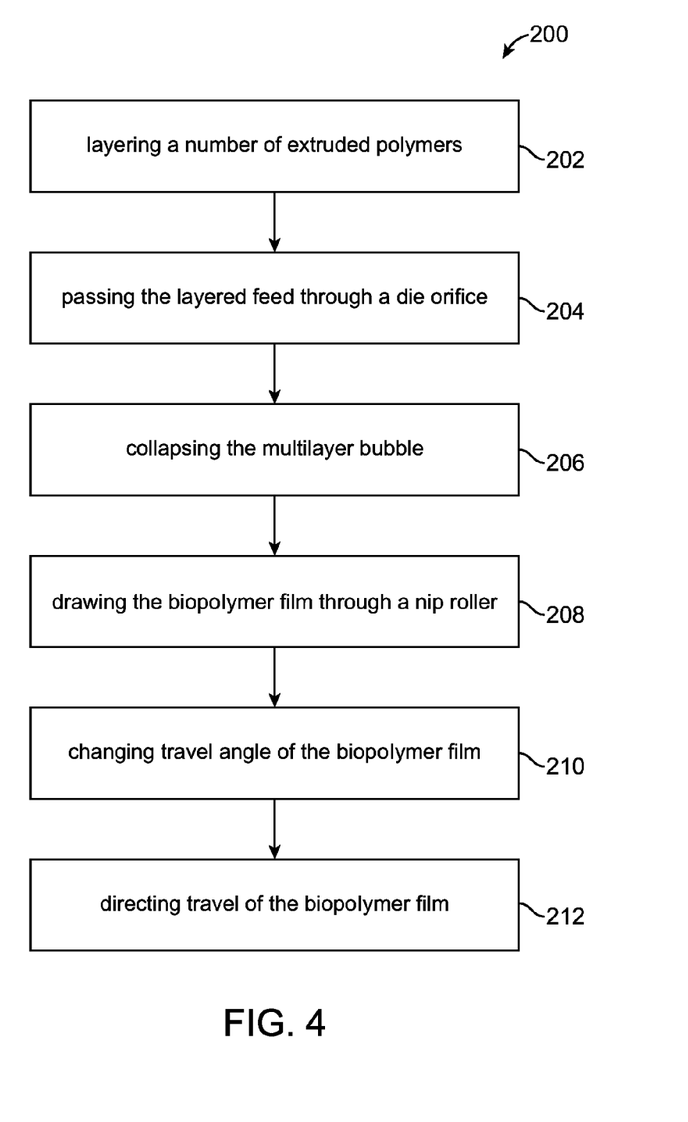
FIG. 4 is a flowchart of a biopolymer blown film extrusion method in accordance with the present invention.

FIG. 4 is a flowchart of a biopolymer blown film extrusion method 200 in accordance with the present invention.

The method 200 of forming a biopolymer blown film includes forming one layer of extruded polymer 202 to form a feed or layering a number of extruded polymers 202 to form a layered feed, passing the layered feed through a die orifice 204 to form a multilayer bubble, collapsing the multilayer bubble 206 to form a biopolymer film, drawing the biopolymer film through a nip roller 208, changing travel angle of the biopolymer film 210 with a turning bar, and directing travel of the biopolymer film 212 with a travel roller. At least one of the extruded polymers is a biopolymer.

The method 200 can include actions to prevent the multilayer bubble and biopolymer film from tearing and/or wrinkling. In one embodiment, passing the layered feed through a die orifice 204 can also include maintaining heated air inside the multilayer bubble. In another embodiment, the method 200 can include heating the nip roller. In another embodiment, the method 200 can include separating the turning bar from the biopolymer film with a heated air stream from the turning bar.

In one embodiment, the die orifice in the multilayer die can be less than or equal to 0.070 inches wide to increase the pressure in the multilayer die. The method 200 can include maintaining pressure of the layer feed before the die orifice at greater than or equal to 2000 psi. In another embodiment, the travel roller can be concave to reduce wrinkling of the biopolymer film. In one example, the concavity can be about 0.060 inches.

Typically, PLA is very stiff and unyielding, having an elongation between 10-20% in one direction. Experimentation has determined that elongation at break of 180% or more (180%-500% for example) in one direction is preferable. One embodiment relates to a method of forming a biopolymer blown film comprising forming a first or inner layer having at least an amorphous polylactic acid polymer (PLA) and two additives as provided in TABLES 1-2 illustrated in FIGS. 7 and 8A-8D, the one layer having a selected elongation at break of 180° or more in one direction and heat sealing at 200° F. or less (195° F. for example); and forming at least one or more other layers (one or more outer or core layers) having semicrystalline polylactic acid polymer (PLA) and at least two additives as provided in TABLES 1-2 illustrated in FIGS. 7 and 8A-8D, the one or more other layers having a selected elongation at break of 180° or more in one direction.

Figure 5:
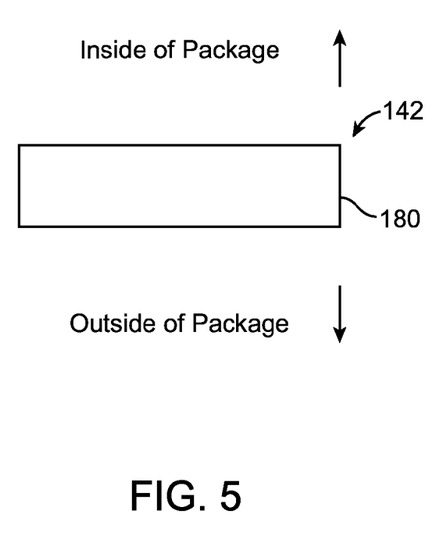
FIG. 5 is a side view of one layer formed using a biopolymer blown film extrusion system in accordance with the present invention.

This method further includes the one layer having at least amorphous polylactic acid polymer (PLA), polycaprolactone and ethylene acrylate copolymer (at least 65% by weight amorphous polylactic acid polymer (PLA), at least 15% by weight polycaprolactone and at least 10% by weight ethylene acrylate copolymer as provided in TABLES 1-2 illustrated in FIGS. 7 and 8A-8D), The method further includes the one or more other layers having at least 75% by weight semicrystalline polylactic acid polymer (PLA), 10% by weight aliphatic-aromatic copolyester and 10% by weight ethylene acrylate copolymer. It is contemplated that the biopolymer film having a thickness between 0.6 and 9 mils, while other embodiments have a thickness between 0.8 and 2.0 mils. FIG. 5, in which like elements share like reference numbers with FIG. 1, illustrates an embodiment of the film 142 comprised of one layer 180, the layer having a first or inside surface and a second or outside surface as illustrated by the arrows, where the film is between 0.6 and 9 mils in thickness, more specifically between 0.8 and 2.0 mils in thickness. In at least one embodiment, layer 180 includes a biopolymer and at least two additives as illustrated in TABLES 2 illustrated in FIGS. 8A-8D. One exemplary embodiment of layer 180 includes an amorphous polylactic acid polymer (PLA), polycaprolactone and ethylene acrylate copolymer as illustrated in TABLES 2 illustrated in FIGS. 8A-8D, such that layer 180 has a selected elongation at break of 180% or more in one direction and heat sealing at 200° F. or less (195° F. for example). Another exemplary embodiment of layer 180 includes an amorphous polylactic acid polymer (PLA), polycaprolactone, ethylene acrylate copolymer, an antistat and an slip/antiblock as illustrated in TABLES 2 illustrated in FIGS. 8A-8D, such that layer 180 has a selected elongation at break of 180% or more in one direction and heat sealing at 200° F. or less (195° F. for example).

Figure 6:
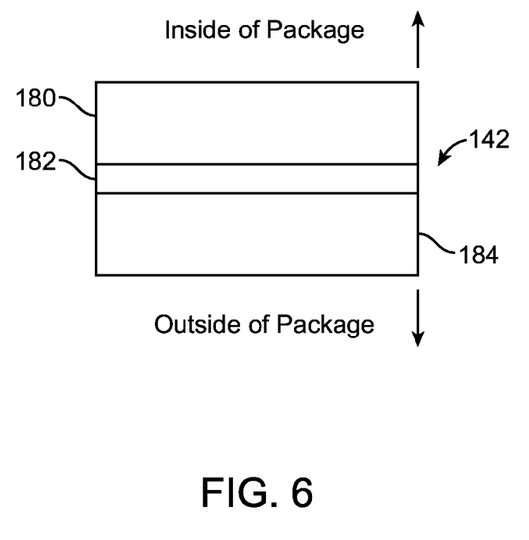
FIG. 6 is a side view of a plurality of layers formed using a biopolymer blown film extrusion system in accordance with the present invention.

FIG. 6, in which like elements share like reference numbers with FIGS. 1 and 5, illustrates film 142 comprised of a plurality of layers. Although three layers are illustrated, two or more layers are contemplated. As illustrated, in this embodiment, film 142 includes first or inner layer 180, second or core layer 182 and third or outer layer 184, where inner and outer (alternatively inside and outside) are indicated by the arrows, where the film is between 0.6 and 9 mils in thickness, more specifically between 0.8 and 2.0 mils in thickness. In at least one embodiment, layer 180 and at least one of layers 182 and 184 include a biopolymer and at least two additives as illustrated in TABLES 2 illustrated in FIGS. 8A-8D.

In at least one embodiment, the biopolymer film includes at least one layer having at least 75% by weight semicrystalline polylactic acid polymer (PLA), 10% by weight copolyester and 10% by weight ethylene acrylate copolymer. In at least one other embodiment, the biopolymer film includes at least one layer having about 60% or more amorphous PLA, 10%-25% polycaprolactone, and 5-15% ethylene acrylate copolymer. In still one other embodiment, the biopolymer film includes at least one layer having about 60% or more PLA, 10-25% aliphatic aromatic copolyester, 5-15% ethylene acrylate copolymer and 2-4% slip additive.

One exemplary embodiment of film 142 of FIG. 6 includes layer 180 including an amorphous polylactic acid polymer (PLA), polycaprolactone and ethylene acrylate copolymer, while both layers 182 and 184 include semicrystalline polylactic acid polymer (PLA), copolyester and ethylene acrylate copolymer in the same or different proportions, as illustrated in TABLES 2 illustrated in FIGS. 8A-8D, such that layer 180 has a selected elongation at break of 180% or more in one direction and heat sealing at 200° F. or less (195° F. for example), while layers 182 and 184 have a selected elongation at break of 180% in one direction but are more heat stable (i.e., resistant to heat deflection) in comparison to layer 180.

Another exemplary embodiment of film 142 includes layer 180 including an amorphous polylactic acid polymer (PLA), polycaprolactone, ethylene acrylate copolymer, an antistat and an slip/antiblock, while both layers 182 and 184 include semicrystalline polylactic acid polymer (PLA), aliphatic-aromatic copolyesters and ethylene acrylate copolymer in the same or different proportions, such that layer 180 has a selected elongation at break of 180% or more in one direction and heat sealing at 200° F. or less (195° F. for example), while layers 182 and 184 have a selected elongation at break of 180% in one direction but are more heat stable (i.e., resistant to heat deflection) in comparison to layer 180.

While embodiments are discussed wherein the one more layers have similar physical properties, it is contemplated that the one or more layers may have similar, nearly similar or different physical properties due to the synergistic effects of two or more additives of the same or different layers. For example, the elongation at break of two or more layers may both be greater than 180%, but the elongation at break for one layer may be different from the elongation at break for one or more other layers due to the synergistic effects of at least two of the additives in the one or more layers having new or unexpected results, as one skilled in the art would appreciate.

Figure 9:
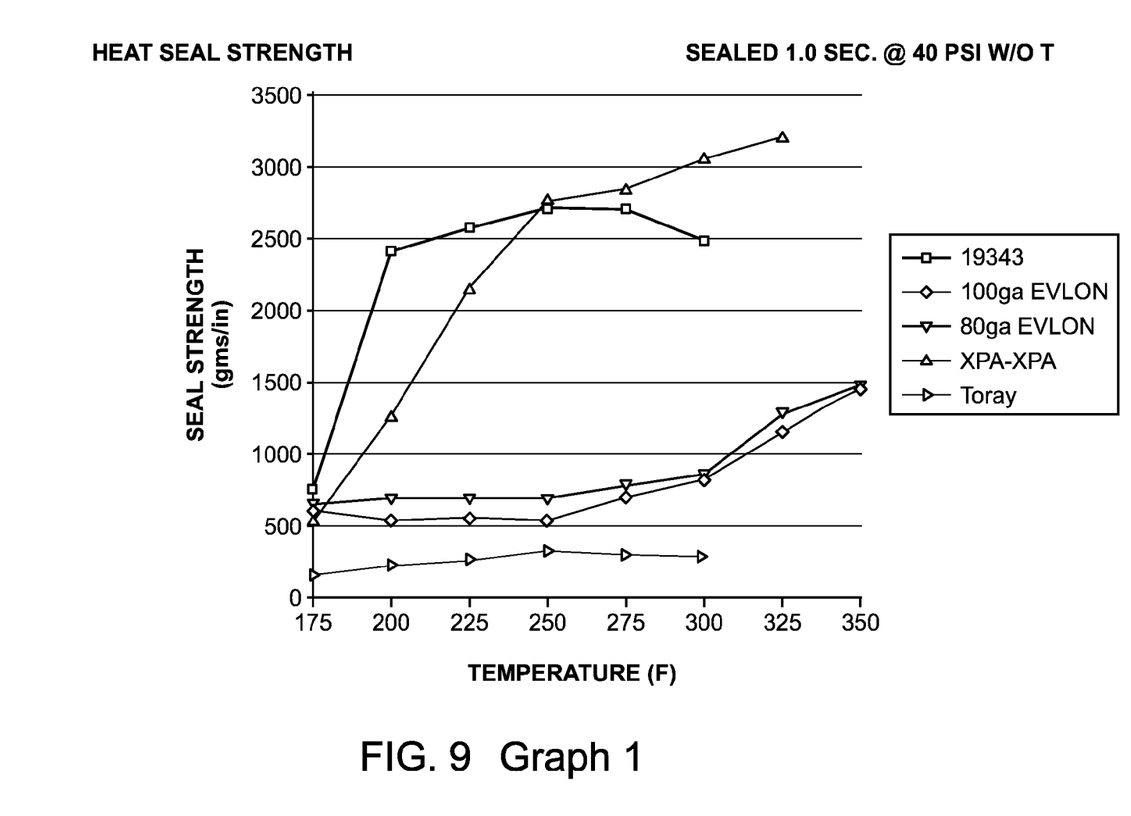
FIG. 9 depicts GRAPH 1 depicts data for the heat seal strength of various formulations used to form one of more layers of the biopolymer film using the biopolymer blown film extrusion system in accordance with the present invention.

GRAPH 1 illustrated in FIG. 9 depicts data for the heat seal strength of various formulations used to form one of more layers of the biopolymer film using the biopolymer blown film extrusion system in accordance with the present invention.

While the embodiments of the invention disclosed herein are presently considered to be preferred, various changes and modifications can be made without departing from the scope of the invention. The scope of the invention is indicated in the appended claims, and all changes that come within the meaning and range of equivalents are intended to be embraced therein.

We claim:

1. A method of forming a biopolymer blown film comprising:
    extruding at least one biopolymer having at least two additives to form a feed;
    passing the feed through a die orifice to form a bubble;
    collapsing the bubble to form a biopolymer film having at least one of a selected elongation at break of 180% or more in one direction and heat sealing at 195° F. or less;
    drawing the biopolymer film through a nip roller;
    changing travel angle of the biopolymer film with a turning bar;
    separating the turning bar from the biopolymer film with a heated air stream from the turning bar; and
    directing travel of the biopolymer film with a travel roller.

2. The method of claim 1 wherein the passing the feed through a die orifice further comprises maintaining heated air inside the bubble.

3. The method of claim 1 further comprising centering the bubble before the collapsing.

4. The method of claim 1 wherein collapsing the bubble further comprises frictionally heating the bubble.

5. The method of claim 1 further comprising heating the nip roller.

6. The method of claim 1 wherein the die orifice is less than or equal to 0.070 inches wide.

7. The method of claim 1 further comprising maintaining pressure in the die orifice at greater than or equal to 2000 psi.

8. The method of claim 1 wherein the travel roller includes a concavity of about 0.060 inches.

9. The method of claim 1 wherein the biopolymer comprises at least one of an amorphous polylactic acid polymer (PLA) and a semicrystalline polylactic acid polymer (PLA).

10. The method of claim 9 wherein the amorphous polylactic acid polymer (PLA) is 17% or more of the total weight of the biopolymer film.

11. The method of claim 9 wherein the amorphous polylactic acid polymer (PLA) is 65% or more of the total weight of the biopolymer film.

12. The method of claim 1 wherein at least one of the two additives is selected from the group consisting of an crosslinker, a polycaprolactone resin, an impact modifier such as ethylene acrylate copolymer, a melt strength improver, a slip modifier, an antistat, an anti-block modifier, a surface appearance modifier, and a processing aid.

13. The method of claim 12 wherein at least one of the two additives is 1% or more of the total weight of the biopolymer film.

14. The method of claim 12 wherein the at least one of the two additives is 2% or more of the total weight of the biopolymer film.

15. A method of forming a biopolymer blown film comprising:
    layering a plurality of extruded polymers to form a layered feed, at least one of the plurality of extruded polymers being a biopolymer having at least two additives;
    passing the layered feed through a die orifice to form a multilayered bubble;
    collapsing the multilayered bubble to form a biopolymer film having at least one layer having a selected elongation at break of 180% or more in one direction and heat sealing at 195° F. or less;
    drawing the biopolymer film through a nip roller;
    changing travel angle of the biopolymer film with a turning bar;
    separating the turning bar from the biopolymer film with a heated air stream from the turning bar; and
    directing travel of the biopolymer film with a concave travel roller.

* * * * *